United States Patent
Yang et al.

(10) Patent No.: US 8,521,744 B2
(45) Date of Patent: Aug. 27, 2013

(54) APPARATUS AND METHOD FOR AUTHORING DATA IN COMMUNICATION SYSTEM

(75) Inventors: Seung-Jun Yang, Daejeon (KR); Min-Sik Park, Daejeon (KR); Han-Kyu Lee, Daejeon (KR); Jin-Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 13 days.

(21) Appl. No.: 12/945,055

(22) Filed: Nov. 12, 2010

(65) Prior Publication Data
US 2011/0173200 A1     Jul. 14, 2011

(30) Foreign Application Priority Data
Nov. 13, 2009   (KR) .................... 10-2009-0109575
Nov. 8, 2010    (KR) .................... 10-2010-0110387

(51) Int. Cl.
*G06F 17/30* (2006.01)
(52) U.S. Cl.
USPC .................................. 707/739; 709/231
(58) Field of Classification Search
USPC ................... 707/608, 101, 803; 709/231
See application file for complete search history.

(56) References Cited

U.S. PATENT DOCUMENTS

| | | | |
|---|---|---|---|
| 6,732,090 B2* | 5/2004 | Shanahan et al. | 1/1 |
| 7,181,444 B2* | 2/2007 | Porter et al. | 1/1 |
| 7,668,963 B1* | 2/2010 | Miner et al. | 709/231 |
| 7,844,644 B2* | 11/2010 | Shin | 707/821 |
| 7,899,847 B2* | 3/2011 | Lau et al. | 707/803 |
| 8,150,798 B2* | 4/2012 | Ma et al. | 707/608 |
| 2006/0149763 A1* | 7/2006 | Koyabu | 707/101 |
| 2007/0101271 A1* | 5/2007 | Hua et al. | 715/731 |
| 2007/0168374 A1* | 7/2007 | Bourne et al. | 707/101 |
| 2009/0210905 A1 | 8/2009 | Maruyama et al. | |
| 2010/0135646 A1* | 6/2010 | Bang et al. | 386/124 |

FOREIGN PATENT DOCUMENTS

| | | |
|---|---|---|
| KR | 10-2007-0047601 | 5/2007 |
| KR | 10-2007-0121385 | 12/2007 |
| KR | 10-2008-0107518 | 12/2008 |

OTHER PUBLICATIONS

Seung-Jun Yang et al., "Metadata Authoring Tool for Digital Broadcasting Contents".
HeeKyung Lee et al., "Metadata Archiving Function for Personalized DMB System", , The Korean Society of Broadcast Engineers, vol. 14, No. 3, Sep. 2009.
H. Y. Kim et al., "DMB-AF: The DMB File Format Standard and Its Applications", Electronics and Telecommunications Trend Analysis, vol. 23, No. 3, Jun. 2008.

(Continued)

*Primary Examiner* — James Trujillo
*Assistant Examiner* — Thong Vu
(74) *Attorney, Agent, or Firm* — Staas & Halsey LLP

(57) ABSTRACT

An apparatus for authoring data in a communication system includes: an extraction unit configured to receive media corresponding to contents and extract contents information regarding the contents from the received media; a generation unit configured to generate a DMB ECG XML-based metadata comprising the extracted contents information; and a processing unit configured to visualize particulars of the DMB ECG XML-based metadata through a user interface and process the user interface so that the DMB ECG XML-based metadata is generated and edited on a template.

19 Claims, 13 Drawing Sheets
(9 of 13 Drawing Sheet(s) Filed in Color)

(56) References Cited

OTHER PUBLICATIONS

Seung-Jun Yang et al., "Study of Metadata for DMB Contents Storage Format", The Korean Society of Broadcast Engineers, Nov. 2008.
Yong-Han Kim et al., "DMB-AF Standard", The Korean Society of Broadcast Engineers, vol. 14, No. 2, Jun. 2009.
TTAS.KO-07.0040, "XML Specification for VHF Digital Multimedia Broadcasting (DMB) Electronic Programme Guide", TTA, Oct. 2006.
TAK.KO-07.0060/R1, "XML Specification for Terrestrial Digital Multimedia Broadcasting (DMB) Electronic Content Guide (ECG)", TTA, Dec. 2008.
MPEG-A, "Information Technology-Multimedia Application Format (MPEG-A)—Part 9: Digital Multimedia Broadcasting Application Format (ISO/IEC FDIS 23000-9)", MPEG, Jan. 2008.
"MAF Overview", ISO/IEC JTC1/SC29/WG11/N8511, Hangzhou, China, Oct. 2006 (filed on Jul. 2006).
ETSI TS 102 822-4 V1.3.1, "Broadcast and On-Line Services: Search, Select, and Rightful Use of Content on Personal Storage Systems ("TV-Anytime"); Part 4: Phase 1—Content Referencing", Nov. 2007 (filed on Aug. 2007).
ETSI TS 102 822-3-1 V1.4.1, "Broadcast and On-Line Services: Search, Select, and Rightful Use of Content on Personal Storage Systems ("TV-Anytime"); Part 3: Metadata; Sub-Part 1: Phase 1—Metadata Schemas", Nov. 2007 (filed on Aug. 2007).
ETSI TS 102 822-3-3 V1.2.1, "Broadcast and On-Line Services: Search, Select, and Rightful Use of Content on Personal Storage Systems ("TV-Anytime"); Part 3: Metadata; Sub-Part 3: Phase 2—Extended Metadata Schema", Nov. 2007 (filed on Jun. 2007).

\* cited by examiner

APPARATUS AND METHOD FOR AUTHORING DATA IN COMMUNICATION SYSTEM

CROSS-REFERENCES TO RELATED APPLICATIONS

The present application claims priority of Korean Patent Application Nos. 10-2009-0109575 and 10-2010-0110387, filed on Nov. 13, 2009, and Nov. 8, 2010, respectively, which are incorporated herein by reference in their entirety.

BACKGROUND OF THE INVENTION

1. Field of the Invention

Exemplary embodiments of the present invention relate to a communication system; and, more particularly, to an apparatus and a method for authoring metadata regarding contents so that, in conformity with user demands for contents, users are provided with various types of user-friendly contents in a digital broadcasting system.

2. Description of Related Art

There has been performed a wide range of research to provide users with services of various levels of QoS (Quality of Service) having a high transmission rate in the current communication systems. A number of approaches have been proposed to transmit various types of contents rapidly through limited resources in a digital broadcasting system, which is an example of such communication systems.

Current digital broadcasting systems require methods for providing users with more diversified digital broadcasting contents, specifically user-friendly broadcasting contents that conform to user demands for services. In the case of DMB (Digital Multimedia Broadcasting), which is a type of digital broadcasting system, when users are provided with a DMB service, they are also provided with information regarding DMB contents, i.e. DMB EPG (Electronic Program Guide).

Users provided with broadcasting services in such a digital broadcasting system, specifically DMB system, tend to demand more diversified broadcasting services, i.e. contents. However, current digital broadcasting systems have limitations in providing information regarding contents, which is needed to provide contents. In other words, the above-mentioned DMB EPG, which is necessarily provided when DMB contents are provided by the DMB system, cannot properly provide every piece of information regarding various contents in conformity with user demands for various types of contents. Specifically, the DMB EPG cannot guarantee efficient access, consumption, and storage of contents requested by users.

Consequently, there is a need for a method for authoring data regarding contents, i.e. metadata, so that as users demand various types of contents in a communication system, e.g. digital broadcasting system, the users are enabled to access, consume, and store the desired contents efficiently, i.e. the users are provided with various types of user-friendly contents.

SUMMARY OF THE INVENTION

An embodiment of the present invention is directed to an apparatus and a method for authoring data in a communication system.

Another embodiment of the present invention is directed to an apparatus and a method for authoring metadata regarding contents in a digital broadcasting system.

Another embodiment of the present invention is directed to an apparatus and a method for authoring metadata regarding various contents so that, in conformity with user demands for various contents, the users are provided with various contents in a user-friendly manner in a digital broadcasting system.

Another embodiment of the present invention is directed to an apparatus and a method for authoring metadata regarding various types of contents, which are to be provided to users in a digital broadcasting system, based on a DMB (Digital Multimedia Broadcasting) ECG (Electronic Content Guide) XML (eXtensible Markup Language).

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for authoring data in a communication system includes: an extraction unit configured to receive media corresponding to contents and extract contents information regarding the contents from the received media; a generation unit configured to generate a DMB (Digital Multimedia Broadcasting) ECG (Electronic Content Guide) XML (eXtensible Markup Language)-based metadata comprising the extracted contents information; and a processing unit configured to visualize particulars of the DMB ECG XML-based metadata through a user interface and process the user interface so that the DMB ECG XML-based metadata is generated and edited on a template.

In accordance with another embodiment of the present invention, a method for authoring data in a communication system includes: receiving media corresponding to contents; extracting detailed information regarding the contents and segments from the received media; processing a user interface regarding the contents; generating and editing each of ECG metadata, segment metadata, package metadata, and DMB AF metadata comprising the detailed information regarding contents and segments based on visualization on a template through the user interface; and authoring DMB ECG XML-based metadata through the basic ECG metadata, the segment metadata, the package metadata, and the DMB AF metadata.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF SPECIFIC EMBODIMENTS

Figure 1:
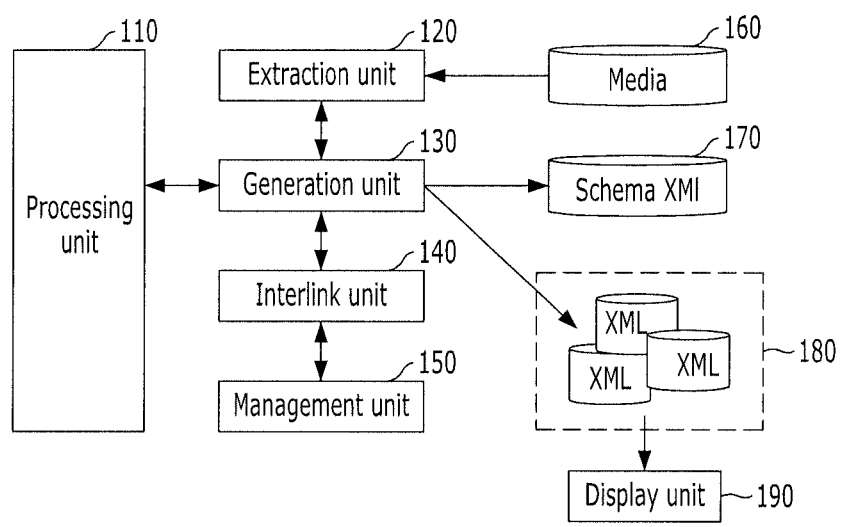
FIG. 1 illustrates a schematic structure of a metadata authoring apparatus in a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention proposes an apparatus and a method for authoring data, particularly metadata, regarding contents so that users are provided with various types of contents in conformity with their demands, i.e. in a user-friendly manner, in a communication system, e.g. a digital broadcasting system. In accordance with an embodiment of the present invention, when users are provided with various types of DMB contents in conformity with user demands for various contents in a digital broadcasting system, e.g. a DMB system, information (i.e. metadata) regarding the DMB contents is authored based on a DMB ECG XML including a DMB EPG. Those skilled in the art can understand that, although authoring of metadata regarding contents in accordance with exemplary embodiments of the present invention will be described with reference to a digital broadcasting system as an exemplary communication system, the apparatus and method for authoring data proposed by the present invention are also applicable to other types of communication systems.

In accordance with an embodiment of the present invention, metadata regarding contents, e.g. DMB ECG metadata, is authored so that as users request various types of contents, the users are enabled to access, consume, and store desired contents efficiently, i.e. the users are provided with various types of contents in a user-friendly manner. In accordance with an embodiment of the present invention, when metadata is authored, previously authored metadata is re-edited and authored to support reusability of metadata. In addition, metadata regarding unit programs of contents are generated and interlinked to support media processing of metadata. Furthermore, tools for segment metadata authoring support automation of metadata authoring, visualization of metadata particulars, and editing on a visualized template.

In accordance with an embodiment of the present invention, when information (metadata) regarding contents is authored based on a DMB ECG XML, the DMB ECG XML includes a service function provided by a DMB EPG, and searching and browsing segment by segment within contents programs enable users to access, consume, and store desired contents more efficiently, thereby providing an improved service in the DMB EPG. The DMB ECG XML includes a file format of DMB AF (Application Format), which couples all contents particulars in a single format. Metadata authored based on a DMB ECG XML in this manner provides users with custom-made services and, in order to describe detailed information regarding contents, a new type of metadata is generated, or previously generated metadata is re-edited to author metadata. In accordance with an embodiment of the present invention, contents-related DMB ECG metadata and DMB AF are authored to provide user-friendly contents.

In accordance with an embodiment of the present invention, as terminals for receiving contents and providing users with them tend to have improved capabilities for network access, large-amount storage, and data processing, metadata regarding contents is authored based on a DMB ECG XML so as to provide more diversified user-friendly contents through such terminals, and metadata authored in this manner is transmitted to terminals through multiplexing streams, i.e. multiplexed with contents streams and transmitted. Specifically, in accordance with an embodiment of the present invention, in order to satisfy user demands for new services and to activate DMB services, personalized broadcast consumption environments, which combine DMB and communication networks, are used to provide contents optimized for users' needs, preferences, and environments. In order to provide such a new type of broadcasting service, which combines contents and data services, a user-tailored watching broadcasting service based on metadata is provided. Users of this service can efficiently search, acquire, and consume desired contents through terminals, which are configured for various types of access, at any place and time. To this end, in accordance with an embodiment of the present invention, metadata is authored based on a DMB ECG XML.

In accordance with an embodiment of the present invention, as contents are provided through metadata authored based on a DMB ECG XML, an extended service is provided, while functionally incorporating a DMB EPG-based service, so as to enable users to access, consume, and store desired contents more efficiently through searching and browsing segment by segment within programs. In accordance with an embodiment of the present invention, a broadcasting service is provided, as a specific type of the above-mentioned extended service, to enable watchers to consume contents at any desired time, i.e. regardless of the broadcasting schedule, using a PDR (Personal Digital Recorder) having a storage device by default. In order to provide such a broadcasting service, a DMB ECG XML for authoring metadata regarding contents includes and supports a file format of DMB AF, which couples all contents particulars in a single format. In accordance with an embodiment of the present invention, contents-related DMB ECG metadata and DMB AF are authored based on a DMB ECG XML so as to provide various types of contents in a user-friendly manner. An apparatus for authoring metadata regarding contents in a communication system, e.g. a digital broadcasting system, in accordance with an embodiment of the present invention will now be described in more detail with reference to FIG. 1.

FIG. 1 illustrates a schematic structure of a metadata authoring apparatus in a communication system in accordance with an embodiment of the present invention.

Referring to FIG. 1, the metadata authoring apparatus is configured to, during authoring of metadata, re-edit and author previously authored metadata to support reusability of metadata, generate and interlink metadata regarding unit programs of contents to support media processing of metadata, support automation of metadata authoring through tools for segment metadata authoring, and support visualization of metadata particulars and editing on a visualized template. To this end, the metadata authoring apparatus includes an extraction unit 120 configured to extract information regarding contents, e.g. TOC (Table of Contents), from media 160 of various contents, which are to be provided to users in conformity with user demands, a generation unit 130 configured to generate an XML 180 for authoring metadata regarding the contents, a management unit 150 configured to manage metadata regarding the contents, an interlink unit 140 configured to support interlink between the generation unit 140 and the management unit 150 configured to manage the metadata for authoring of the metadata, a processing unit 110 configured to process interface during authoring of the metadata, and a display unit 190 configured to display metadata authoring environments.

The extraction unit 120 is configured to receive media 160, extract information regarding contents, e.g. TOC, from the received media 160, and extract corresponding detailed information regarding contents, i.e. segments of contents. Specifically, when the extraction unit 120 receives metadata, which is stored in a memory or database, from the memory or database as media 160, it extracts the contents information and outputs the information to the generation unit 130. Alternatively, upon receiving contents to be provided to users as media 160, the extraction unit 120 extracts a TOC and segments as the contents information and outputs the TOC and segments to the generation unit 130.

For example, the extraction unit 120 extracts information regarding various types of contents requested by users, e.g. detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types, so that these pieces of information is included in metadata. In other words, the extraction unit 120 is configured to extract detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types, as information regarding various types of contents requested by users.

The extraction unit 120 is configured to extract the identifier and physical location of contents so that the metadata includes a content referencing XML, which is used to acquire the physical location of contents, e.g. the broadcasting time and portal URL (Uniform Resource Locator) of the contents, from the identifier of contents.

The generation unit 130 is configured to receive segments extracted by the extraction unit 120, as well as a schema XML 170, and generate and output an XML 180 and a schema XML 170. Specifically, the generation unit 130 receives previously authored metadata, i.e. DMB ECG XML-based metadata, through the extraction unit 120 as a metadata document. The generation unit 130 also receives a schema XML 170 as a schema document. The generation unit 130 generates new metadata using the received data, or re-edits the previously authored metadata, and outputs an XML 180 as DMB ECG XML-based metadata. The previously authored metadata is stored in the memory or database, and is inputted to the generation unit 130 through the extraction unit 120 as media 160.

The generation unit 130 is configured to generate information regarding various types of contents requested by users, e.g. detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types. The generation unit 130 is configured to generate metadata including a content referencing XML, which is used to acquire the physical location of contents, such as the broadcasting time and URL of contents, from the identifier of contents. The generation unit 130 is configured to generate metadata based on a DMB ECG XML. Specifically, the generation unit 130 generates and edits basic ECG metadata, segment metadata, package metadata, and DMB AF metadata to author final metadata based on the DMB ECG XML.

The memory or database is configured to store previously authored metadata in a DOM (Document Object Model) structure so that metadata information regarding metadata of the DOM structure is inputted to the generation unit 130 through the extraction unit 120 as media 160. The generation unit 130 is configured to use the metadata inputted in this manner, segments extracted by the extraction unit 130, and an inputted schema XML to generate new metadata or re-edit previous metadata, as described above, thereby outputting an XML 180 as current metadata. That is, the generation unit 130 is configured to perform the function of inputting/outputting and processing metadata.

The processing unit 110 is configured to process each interface when the authoring apparatus is performing operations for authoring metadata based on a DMB ECG XML. Specifically, the processing unit 110 processes GUI (Graphical User Interface) to support visualization of particulars of metadata and editing on a visualized template. The GUI will be described later in more detail with reference to FIGS. 4 to 8, and detailed description thereof will be omitted herein.

The management unit 150 is configured to manage metadata authored based on a DMB ECG XML. Specifically, the management unit 150 stores metadata in the memory or database, as described above, and manages the stored metadata. DMB ECG XML-based metadata is stored in the memory or database under the metadata management of the management unit 150, and is provided to a terminal or network through multiple streams as metadata regarding contents requested by users. The DMB ECG XML-based metadata is, as described above, multiplexed with contents streams and transmitted.

The interlink unit 140 is configured to support interlink between modules performing respective functions when the authoring apparatus performs operations for authoring metadata based on a DMB ECG XML, such as input/output of an XML 180 and a schema XML 170, interlink of media 160, GUI interlink with user interface, and XML API (Application Programming Interface) call. Specifically, the interlink unit 140 interlinks with the management unit 150 so that metadata authored based on a DMB ECG XML is stored in the memory or database, and the metadata stored in this manner is provided to a terminal or network.

The display unit 190 is configured to visualize and output particulars of metadata and authoring of metadata through the GUI, as illustrated in FIGS. 4 to 10.

As such, the metadata authoring apparatus in a digital broadcasting system in accordance with an embodiment of the present invention performs the functions of metadata input/output, metadata processing, segment extraction and editing, and metadata interlink to author metadata, e.g. DMB ECG metadata. The apparatus stores the authored metadata in the memory or database, and transmits the metadata to a terminal or network through multiplexed streams. The metadata input/output function includes receiving a metadata document and a schema document and outputting finally authored metadata. The metadata processing function includes visualizing metadata information regarding metadata of DOM structure, which is stored in the memory or database, through the GUI and modifying the metadata information based on an editing message, which has been inputted through interlink with the GUI or media 160. The segment editing is performed through input/output of an XML 180 as metadata, GUI interlink, media interlink, and XML API call. Specifically, when the generation unit 130 generates new metadata or re-edits previous metadata to author metadata based on the DMB ECG XML, the generation unit 130 edits segments of contents as detailed information regarding contents extracted by the extraction unit 120. The DMB ECG XML-based metadata authored by such generation or re-editing is stored in the memory or database through interlink with the management unit 150 and then transmitted to a terminal or network. The DMB ECG XML structure of metadata in a digital broadcasting system in accordance with an embodiment of the present invention will now be described in more detail with reference to FIGS. 2 and 3.

Figure 2:
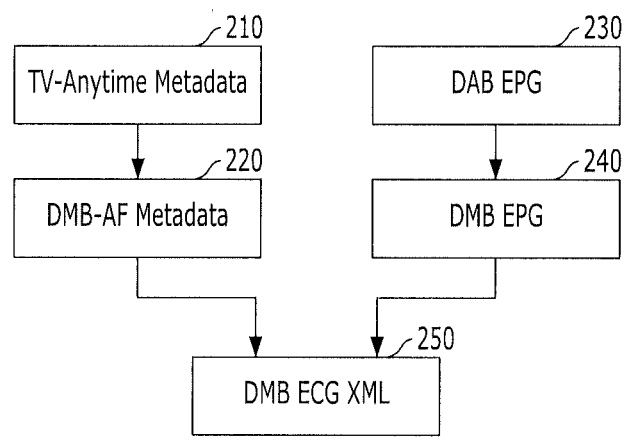
FIGS. 2 and 3 schematically illustrate the DMB ECG XML structure of metadata in a communication system in accordance with an embodiment of the present invention.
Figure 3:
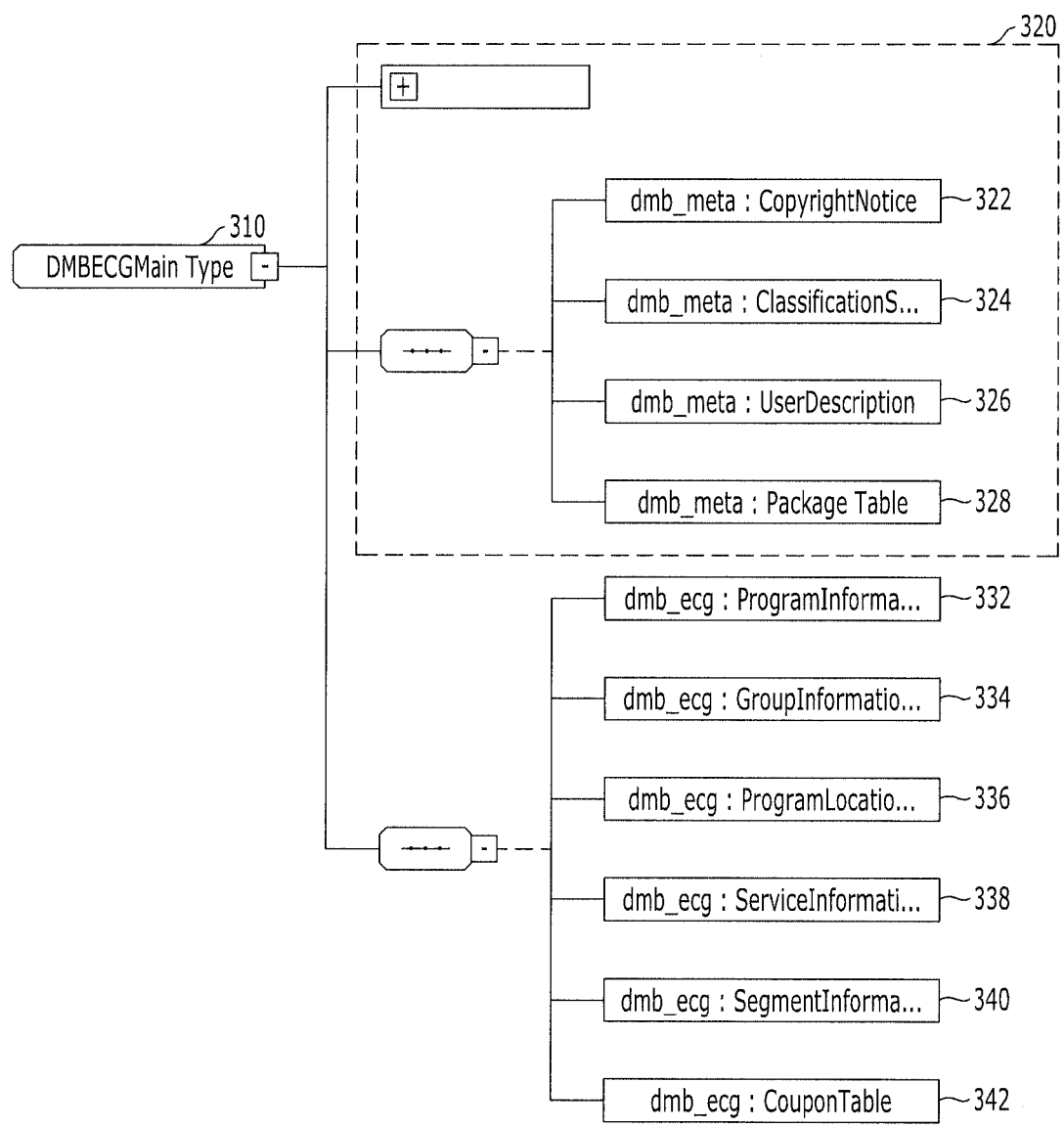

FIGS. 2 and 3 schematically illustrate the DMB ECG XML structure of metadata in a communication system in accordance with an embodiment of the present invention.

Referring to FIGS. 2 and 3, the DMB ECG XML 250 includes detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types, these pieces of information being provided in conformity with user demands for various contents by the digital broadcasting system. The DMB ECG XML 250 also includes a content referencing XML, which is used to acquire the physical location of contents, such as the broadcasting time and URL of contents, from the identifier of contents.

More specifically, the DMB ECG XML 250 includes TV-Anytime metadata 210 as a metadata schema with limited TV-Anytime, and DMB-AF metadata 220 having a partially modified structure of the TV-Anytime metadata 210. The DMB ECG XML 250, which incorporates functions provided by the DMB EPG as described above, includes a DAB (Digital Audio Broadcasting) EPG 230 and a DMB EPG 240, which is an extension of the DAB EPG 230 conforming to DMB environments.

The DMB-AF metadata 220 is obtained by adding and modifying the TV-Anytime metadata 210 in conformity with DMB environments and file data transmission environments. The DMB-AF metadata 220 has a structure partially modified so that, unlike the schema structure of the TV-Anytime metadata 210, the segment information table is positioned below package table/package/item/component elements. The DMB ECG XML 250 has a structure including necessary elements extended so that the schema structure of the DMB-AF metadata 220 includes information regarding contents. The DMB ECG XML 250, which includes functions of the DMB EPG 240 as described above, supports DMB EPG service provision.

The DMB ECG XML 250 has a DMB ECG main type 310 as the uppermost root and includes, as lower items of the DMB ECG main type 310, a program information table 332 for describing detailed information regarding contents such as broadcasting contents and on-demand contents, a group information table 334 for describing contents group information, a program location table 336 for describing contents organization information, a service information table 338 for describing channel information, portal service information, and the like, a segment information table 340 for describing information regarding contents for each time period, and a coupon table 342 for describing information regarding electronic coupons for facilitating contents consumption. The DMB ECG XML 250 includes, as lower items of the DMB ECG main type 310, a package table 328 for packaging various types or kinds of contents to be consumed under various conditions, a user description 326 for systematically describing the user's contents watching history, preference, and the like, a classification scheme table 324 for systematically classifying terms expressing genres or contents types, and a copyright notice table 322 for notifying of copyrights of contents and the like.

The DMB ECG XML 250 has a layer structure extended from the DMB AF as described above. In this connection, the package table 328, the user description 326, the classification scheme table 324, and the copyright notice table 322 belong to parts 320 defined by the DMB AF, while the program information table 332, the group information table 334, the program location table 336, the service information table 338, the segment information table 340, and the coupon table 342 are extensions from the DMB AF. Metadata based on the DMB ECG XML includes, as basic parts of the DMB AF, the package table 328, the user description 326, the classification scheme table 324, and the copyright notice table 322 and includes, as extensions of the DMB AF, the program information table 332, the group information table 334, the program location table 336, the service information table 338, the segment information table 340, and the coupon table 342.

Based on a DMB ECG XML of the above-mentioned structure, metadata regarding contents conforming to user demands for various contents is authored and then stored. When the next metadata is authored, new metadata is generated based on the DMB ECG XML, or the stored, previous metadata is re-edited to author DMB ECG XML-based metadata.

That is, the authoring apparatus in accordance with an embodiment of the present invention generates and edits metadata based on the above-mentioned DMB ECG XML to author final metadata so as to include information regarding various types of contents requested by users, specifically detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types. The metadata authored in this manner is transmitted through streams multiplexed through GUI and interlink, i.e. multiplexed with contents streams and transmitted. Authoring of metadata based on the DMB ECG XML in a digital broadcasting system in accordance with an embodiment of the present invention will now be described in more detail with reference to FIGS. 4 to 9.

FIGS. 4 to 9 illustrate authoring of metadata in a communication system in accordance with an embodiment of the present invention. Specifically, FIGS. 4 to 9 illustrate metadata authoring based on the DMB ECG XML through a user interface, e.g. GUI, visualized by the display unit 190.

Referring to FIGS. 4 to 9, the metadata authoring apparatus constructs a user interface so as to generate and edit basic ECG metadata, segment metadata, package metadata, and DMB AF metadata, according to functional characteristics of elements provided by contents, using information regarding various types of contents requested by users, e.g. detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types. The metadata authoring apparatus also generates and edits basic ECG metadata, segment metadata, package metadata, and DMB AF metadata including information regarding various types of contents requested by users through a user interface, e.g. GUI, to author final DMB ECG XML-based metadata.

Figure 4:
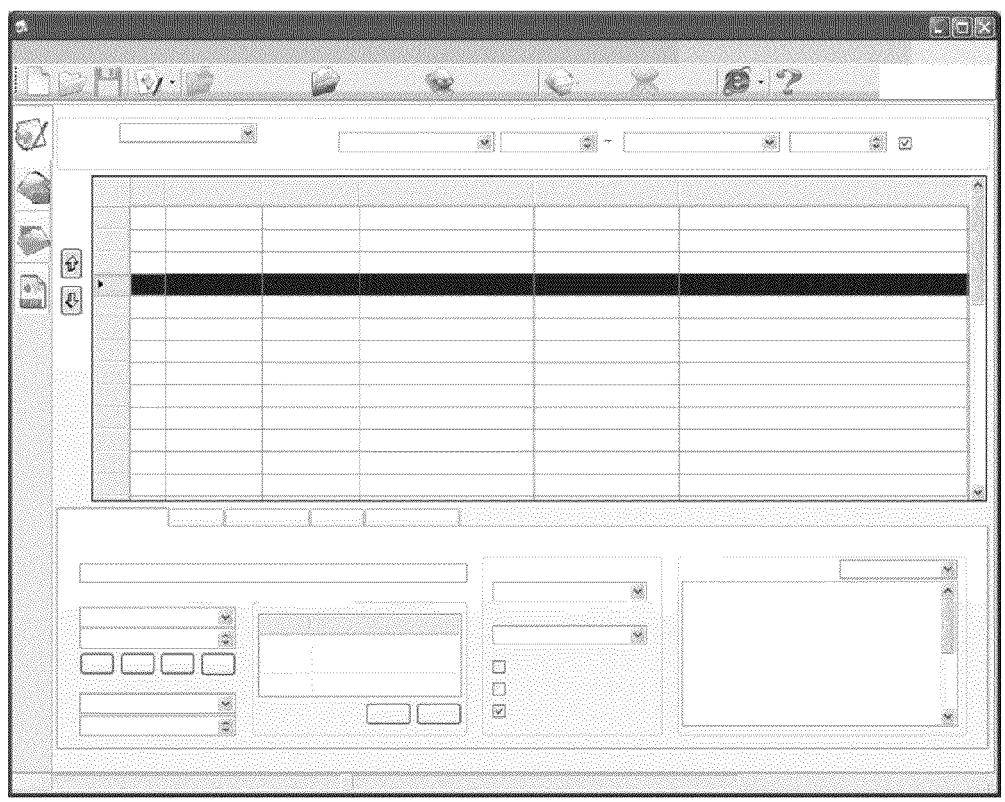
FIGS. 4 to 9 illustrate metadata authoring in a communication system in accordance with an embodiment of the present invention.

More specifically, the metadata authoring apparatus generates and edits basic ECG metadata so as to provide a template-based intuitive data editing environment through a user interface, e.g. GUI, as illustrated in FIG. 4. The metadata authoring apparatus generates basic ECG metadata based on a DMB ECG XML, and the basic ECG metadata generated in this manner is visually expressed on the display unit 190 through the GUI to enable easy editing. Furthermore, according to application of metadata authored based on the DMB ECG XML, the metadata authoring apparatus sets elements of metadata that are frequently used in the metadata, and uses the display unit 190 to display the data type or attribute value of the elements set in this manner through a predetermined template window so that, during authoring of metadata, particulars to be included in the metadata are easily added to the metadata or modified.

That is, the metadata authoring apparatus generates and edits basic ECG metadata as illustrated in FIG. 4 to author DMB ECG XML-based metadata. When the generated, modified, or edited DMB ECG XML-based metadata is stored in the memory or database, the metadata authoring apparatus automatically converts the metadata into an XML document. The converted XML document, i.e. metadata, includes descriptions of brief information regarding respective programs of contents, detailed information, A/V (Audio/Video) attribute information, service channel information, and the like.

Figure 5:

The metadata authoring apparatus, referring to FIG. 5, receives respective program contents streams regarding contents as media 160, automatically detects basic boundary shots from the received respective program contents streams through the user interface, and aligns the detected basic boundary shots into a story, which has been requested regarding contents, to generate segments. Specifically, the extraction unit 120 receives the above-mentioned respective program contents streams as media 160 and detects basic boundary shots through a user interface, e.g. GUI.

Figure 6:
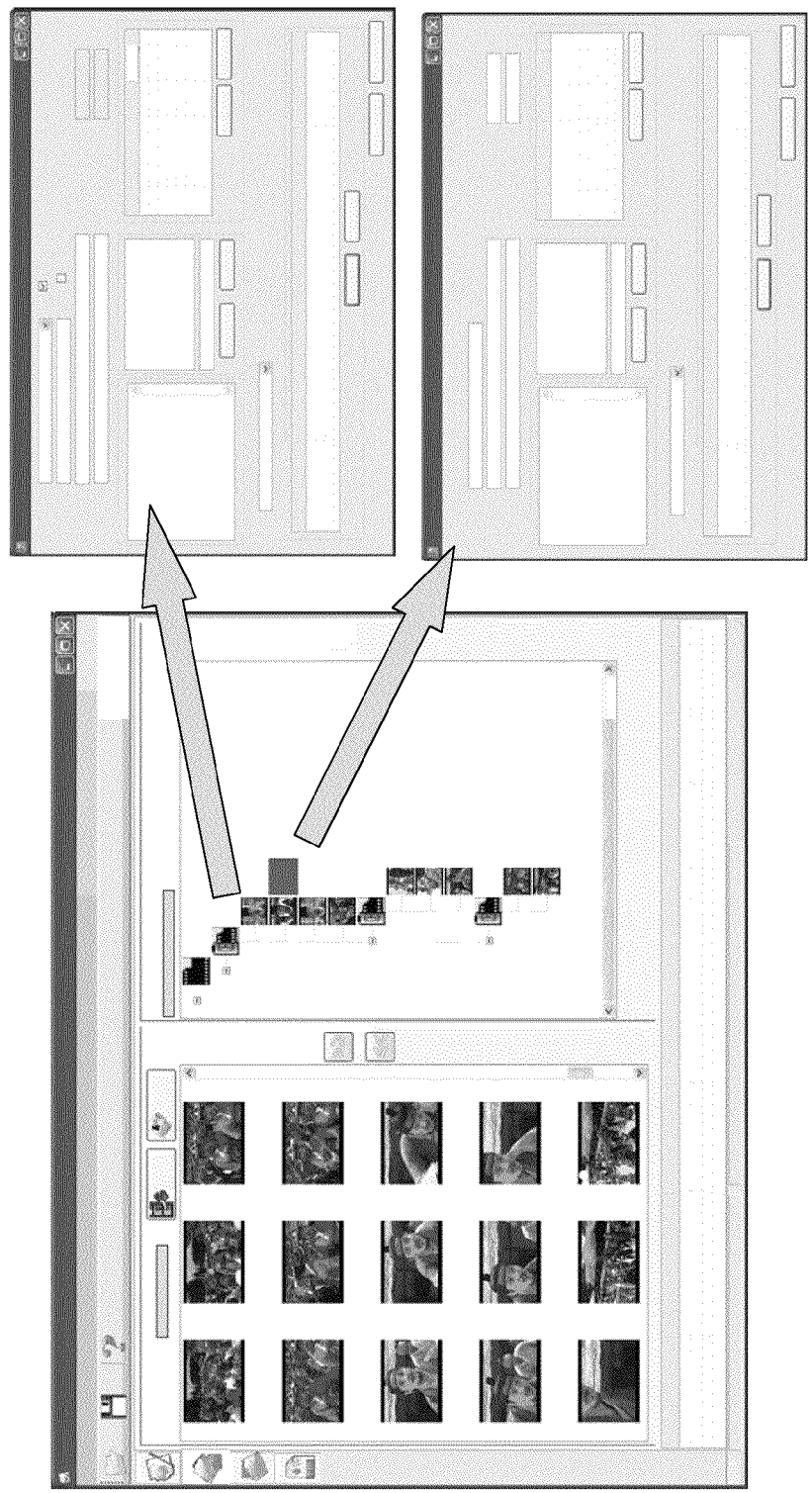

After the detection of basic boundary shots from respective program contents streams and the story alignment to generate segments, the metadata authoring apparatus, referring to FIG. 6, groups the generated segments using a template displayed through the user interface, e.g. GUI, and describes detailed information regarding respective segments, specifically segment ID (Identifier), CRID (Content Reference ID), time information, and segment particulars, so that the metadata includes the described particulars and information. Therefore, the metadata authoring apparatus generates information regarding segments and information regarding segment groups, respectively, and the generated information regarding segments and segment groups is used as lower segment elements in the component elements within the package or the segment information table elements. As such, the metadata authoring apparatus generates and edits segment metadata including information regarding segments and segment groups to author DMB ECG XML-based metadata.

Figure 7:
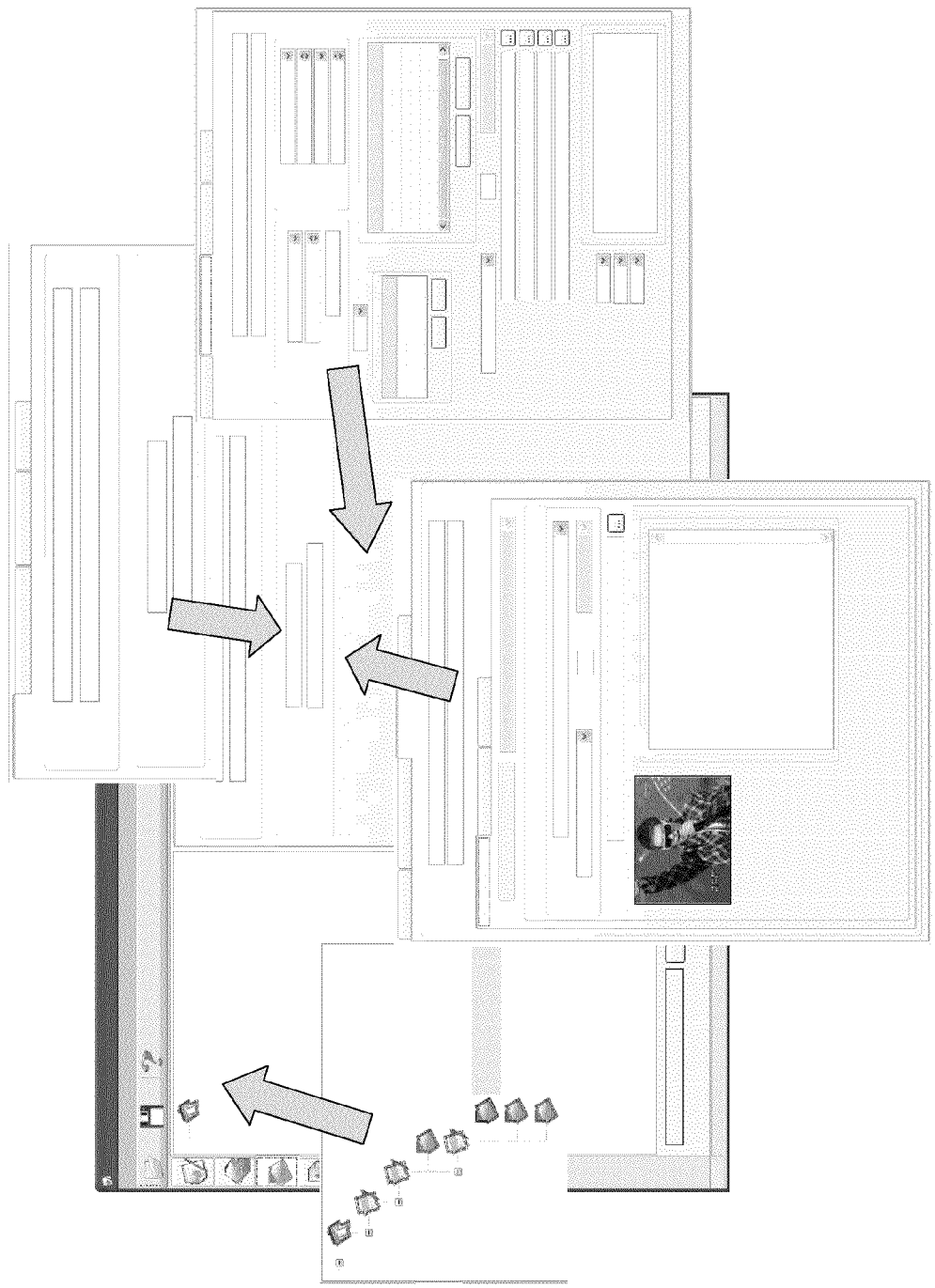

The metadata authoring apparatus, referring to FIG. 7, generates and edits package metadata through the user interface. Specifically, the metadata authoring apparatus generates a structure of items and components, which have been requested regarding contents from a tree structure visualized through a user interface, e.g. GUI. The metadata authoring apparatus then acquires and describes the generated items and components, as well as basic ECG information and segment information, from the template to generate metadata including the described particulars and information. That is, the metadata authoring apparatus generates and adds structural information regarding the package metadata through the items, components, basic ECG information, and segment information, and generates and edits package metadata through the user interface, as illustrated in FIG. 7, thereby authoring DMB ECG XML-based metadata.

Figure 8:
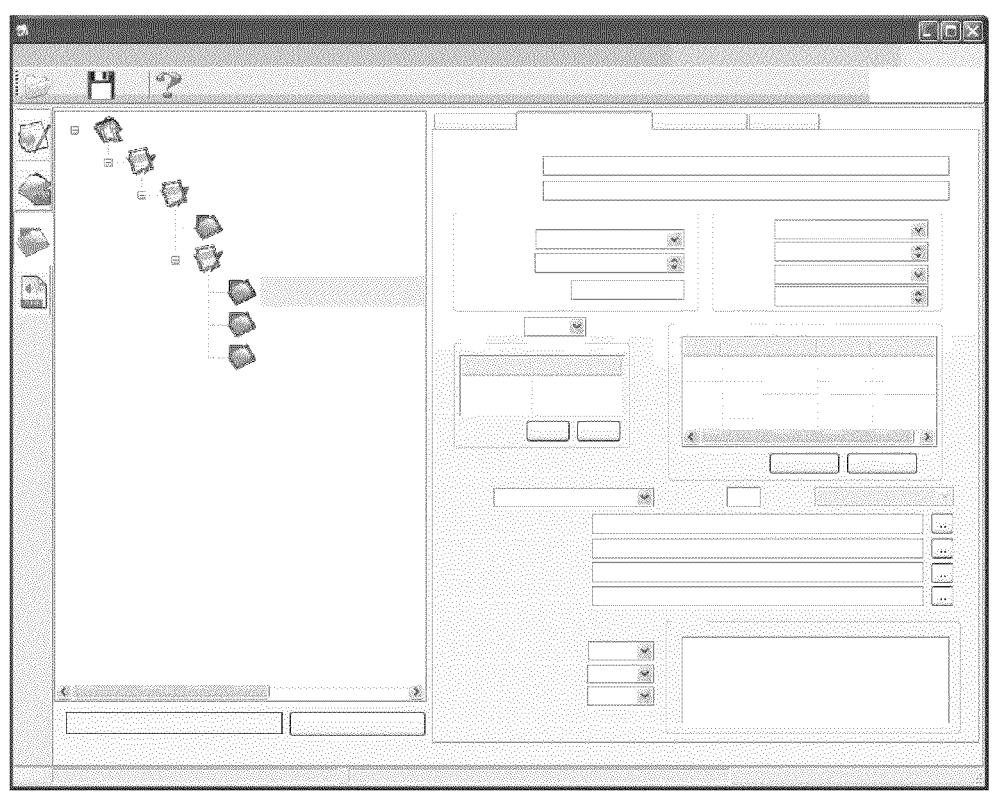

The metadata authoring apparatus, referring to FIG. 8, generates and edits DMB AF metadata through the user interface. Specifically, the metadata authoring apparatus constructs a user interface, which is used to generate and edit the DMB AF metadata, to be similar to the user interface used to generate and edit package metadata described above. Considering that the DMB AF schema has a different root element from the ECG metadata, the metadata authoring apparatus processes the DMB ECG and DMB AF as separate schemas, respectively, to generate DMB AF metadata. That is, the metadata authoring apparatus generates and edits DMB AF metadata as illustrated in FIG. 8 to author DMB ECG XML-based metadata.

Figure 9:

After authoring DMB ECG XML-based metadata in this manner, the metadata authoring apparatus verifies the validity of the authored metadata through the user interface as illustrated in FIG. 9. When it is confirmed that the authored DMB ECG XML-based metadata is not valid, the metadata authoring apparatus visually expresses the location of erroneous elements through the GUI on the display unit 190. Consumption of DMB ECG XML-based metadata in a digital broadcasting system in accordance with an embodiment of the present invention will now be described in more detail with reference to FIGS. 10 to 12.

Figure 10:
FIGS. 10 to 12 illustrate metadata consumption in a communication system in accordance with an embodiment of the present invention.
Figure 11:
Figure 12:
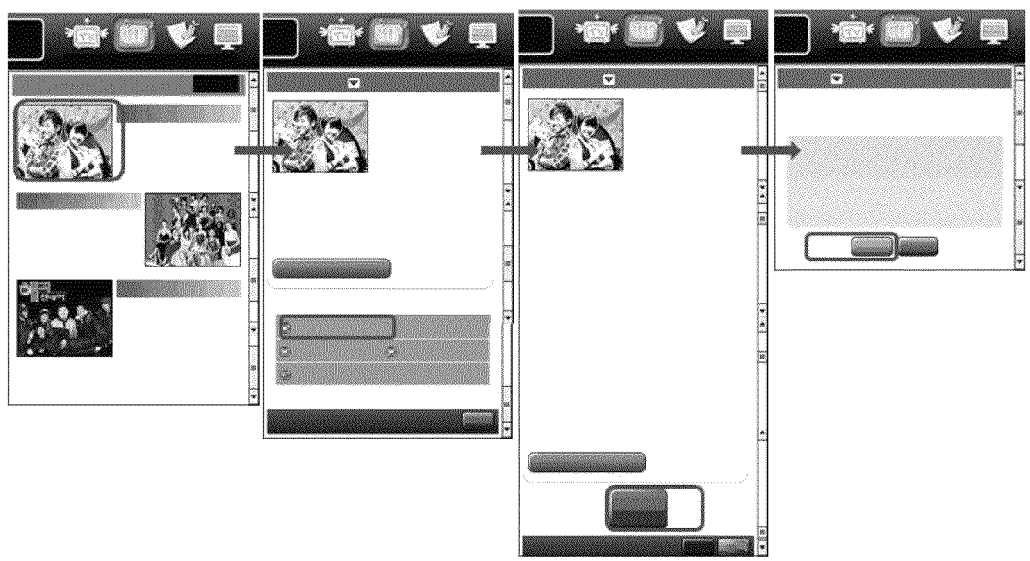

FIGS. 10 to 12 illustrate consumption of metadata in a communication system in accordance with an embodiment of the present invention. Specifically, FIGS. 10 to 12 illustrate consumption by users of DMB ECG XML-based metadata authored through the above-mentioned process.

Referring to FIGS. 10 to 12, DMB ECG XML-based metadata authored through the above-mentioned process is multiplexed with A/V data and transmitted, i.e. as streams multiplexed with contents streams, to a terminal or network through a transmission server. After receiving the DMB ECG XML-based metadata transmitted as multiplexed streams, the terminal consumes the received DMB ECG XML-based metadata as illustrated in FIGS. 10 to 12. Specifically, the metadata authoring apparatus authors the DMB ECG XML-based metadata for a predetermined period of time with regard to a predetermined DMB channel, selects a predetermined program to extract segment information, generates related segment group information based on the extracted segment information, and generates program group information based on considering of relevance between programs. The metadata authoring apparatus also generates package metadata and DMB AF metadata in order to verify the package service and DMB AF circulation service, and the generated metadata is transmitted to the terminal through a bidirectional server as streams multiplexed with A/V data. The DMB AF metadata is generated as a DMB AF file together with various types of DMB AF information, and the generated DMB AF file is transmitted to the terminal through the bidirectional server.

After receiving the DMB ECG XML-based metadata transmitted as streams multiplexed with A/V data, i.e. multiplexed with contents streams and transmitted, the terminal consumes the DMB ECG metadata or basic ECG metadata as illustrated in FIG. 10, consumes the segment metadata as illustrated in FIG. 11, and consumes the DMB AF metadata as illustrated in FIG. 12. The terminal is provided with a service of circulating and consuming contents based on information of metadata in mobile communication network environments of the digital broadcasting system. That is, the terminal is provided with contents by receiving and consuming the XML-based metadata regarding contents. A process of authoring metadata in a digital broadcasting system in accordance with an embodiment of the present invention will now be described in more detail with reference to FIG. 13.

Figure 13:
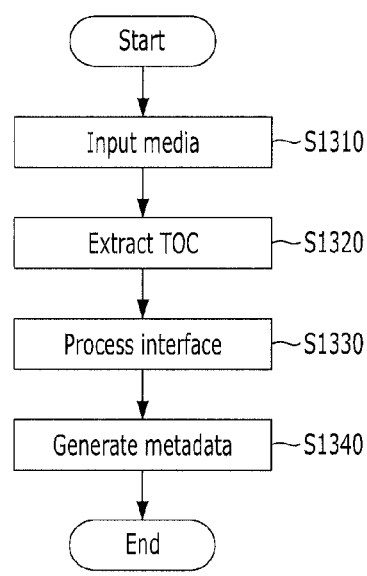
FIG. 13 illustrates a schematic operating process of a metadata authoring apparatus in a communication system in accordance with an embodiment of the present invention.

FIG. 13 illustrates a schematic operating process of a metadata authoring apparatus in a communication system in accordance with an embodiment of the present invention.

Referring to FIG. 13, the metadata authoring apparatus receives previous metadata, which is stored in the memory or database, or contents as media at step S1310. The metadata authoring apparatus extracts a TOC from the received media, and thus extracts segments of contents as detailed information regarding the contents at step S1320. Specifically, the metadata authoring apparatus extracts the TOC so that the metadata includes information regarding various types of contents requested by users, e.g. detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types. That is, the metadata authoring apparatus extracts information regarding various types of contents requested by users, specifically detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types.

The metadata authoring apparatus processes the user interface, e.g. GUI, to generate and edit DMB ECG XML-based metadata including information regarding various types of contents requested by users, specifically detailed information regarding contents such as broadcasting programs and on-demand programs, contents group information, contents organization information, channel information, portal service information, information regarding contents for each time period, electronic coupon information, information regarding packages for expressing various types of contents as a whole, information regarding contents watching history and preferences of users, and information regarding schemes of classifying terms describing genres or contents types at step S1330.

The metadata authoring apparatus generates and edits basic ECG metadata, segment metadata, package metadata, and DMB AF metadata through the user interface to author final DMB ECG XML-based metadata at step S1340. The authored DMB ECG XML-based metadata is stored in the memory or database, and is multiplexed with contents streams and transmitted to a terminal or network.

The authored DMB ECG XML-based metadata includes detailed information regarding contents such as broadcasting programs and on-demand programs, contents group information, contents organization information, channel information, portal service information, information regarding contents for each time period, electronic coupon information, package information, information regarding contents watching history and preferences of users, information regarding schemes of classifying terms describing genres or contents types, and the like. The authored DMB ECG XML-based metadata includes a content referencing XML, which is used to acquire the physical location of contents, such as the broadcasting time and URL of contents, from the identifier of contents. In other words, the DMB ECG XML-based metadata includes TV-Anytime metadata, DMB-AF metadata, DAB EPG, and DMB EPG. That is, the DMB ECG XML-based metadata has a DMB ECG main type as the uppermost root and includes a program information table, a group information table, a program location table, a service information table, a segment information table, a coupon table, a package table, a user description, a classification scheme table, and a copyright notice table.

In accordance with the exemplary embodiments of the present invention, metadata regarding various types of contents, which are to be provided in conformity with user demands in a communication system, is authored based on a DMB ECG XML, so that the users are provided with user-friendly contents and can efficiently access, consume, and store various types of desired contents. In addition, authoring of various pieces of information (i.e. metadata) regarding contents based on a DMB ECG XML guarantees provision of more diversified, plentiful user-friendly contents.

While the present invention has been described with respect to the specific embodiments, it will be apparent to those skilled in the art that various changes and modifications may be made without departing from the spirit and scope of the invention as defined in the following claims.

What is claimed is:

1. An apparatus for authoring data in a communication system, comprising:
   an extraction unit configured to receive Digital Multimedia Broadcasting media corresponding to contents and extract contents information regarding the contents from the received media;
   a generation unit configured to generate a DMB (Digital Multimedia Broadcasting) EGC (Electronic Content Guide) XML (eXtensible Markup Language)-based metadata comprising the extracted contents information; and
   a computer system processing unit configured to visualize particulars of the DMB ECG XML-based metadata through a user interface and process the user interface so that the DMB ECG XML-based metadata is generated and edited on a template showing structural relationships between the metadata and showing error locations,
   wherein the generation unit is configured to author the DMB ECG XML-based metadata by generating and editing DMB AF (Application Format) metadata coupled all contents particulars in a single format, wherein the generation unit is configured to author the DMB ECG XML-based metadata by generating and editing basic ECG metadata, segment metadata, and package metadata.

2. The apparatus of claim 1, wherein the DMB ECG XML-based metadata comprises, as basic parts of the DMB AF metadata, a package table, a user description, a classification scheme table, and a copyright notice table.

3. The apparatus of claim 2, wherein the DMB ECG XML-based metadata comprises, as extended parts of the DMB AF metadata, a program information table, a group information table, a program location table, a service information table, a segment information table, and a coupon table.

4. The apparatus of claim 1, wherein the DMB ECG XML-based metadata comprises TV-Anytime metadata, DMB AF metadata, DAB (Digital Audio Broadcasting) EPG (Electronic Program Guide), and DMB EPG.

5. The apparatus of claim 1, wherein the DMB ECG XML-based metadata comprises detailed information regarding contents of broadcasting programs and on-demand programs, contents group information, contents organization information, channel information, portal service information, information regarding contents for each time period, electronic coupon information, package information, information regarding contents watching history and preference of users, and information regarding schemes of classification terms describing genres or contents types.

6. The apparatus of claim 1, wherein the DMB ECG XML-based metadata comprises a content referencing XML for acquiring broadcasting time and portal URL (Uniform Resource Locator) of the contents as a physical location of the contents from an identifier of the contents.

7. The apparatus of claim 1, wherein the generation unit is configured to generate and edit basic ECG metadata through the user interface in an intuitive data editing environment based on the template, set predetermined elements from the DMB ECG XML-based metadata, and display data types or attribute values regarding the set elements through the template.

8. The apparatus of claim 1, wherein the DMB ECG XML-based metadata is converted to an XML document and stored in a DOM (Document Object Model) structure, and the stored metadata comprises brief information regarding respective programs of the contents, detailed information, A/V (Audio/Video) attribute information, and service channel information.

9. The apparatus of claim 8, wherein the extraction unit is configured to receive the stored metadata as the media and extract a TOC (Table of Contents) and segments from the stored metadata.

10. The apparatus of claim 1, wherein the extraction unit is configured to receive respective program contents streams regarding the contents as the media and detect basic boundary shots from the received respective program contents streams through the user interface.

11. The apparatus of claim 10, wherein the generation unit is configured to generate segments by aligning the detected basic boundary shots into a story, group the generated segments on the template through the user interface, and generate segment metadata comprising detailed information regarding the segments and detailed information regarding the segment groups.

12. The apparatus of claim 11, wherein the detailed information comprises segment ID (Identifier), CRID (Content Reference ID), time information, and segment particulars.

13. The apparatus of claim 1, wherein the generation unit is configured to generate a structure of items and components according to the contents from a tree structure visualized through the user interface and generate package metadata by acquiring the generated items and components, basic ECG information, and segment information on the template.

14. The apparatus of claim 1, wherein the generation unit is configured to generate DMB AF metadata by processing a DMB ECG and a DMB AF, which have different root elements, as separate schemas, respectively.

15. The apparatus of claim 1, wherein the generation unit is configured to output DMB ECG XML-based metadata by receiving and editing metadata documents regarding the contents and schema documents; and
the apparatus further comprises a management unit configured to manage the DMB ECG XML-based metadata and store the DMB ECG XML-based metadata in a memory or database in a DOM structure.

16. The apparatus of claim 1, further comprising an interlink unit configured to support, for editing segments regarding the contents, XML input/output of the DMB ECG XML-based metadata, interlink of the user interface, interlink of the media, and XML API (Application Programming Interface) call.

17. The apparatus of claim 1, wherein the DMB ECG XML-based metadata is multiplexed with streams of the contents and transmitted to a terminal or network provided with the contents.

18. A method for authoring data in a communication system, comprising:
receiving Digital Multimedia Broadcasting media corresponding to contents;
extracting detailed information regarding the contents and segments from the received media;
processing a user interface regarding the contents;
generating and editing each of ECG (Electronic Content Guide) metadata, segment metadata, package metadata, and DMB (Digital Multimedia Broadcasting) AF (Application Format) metadata comprising the detailed information regarding contents and segments based on visualization on a template through the user interface showing structural relationships between the metadata and showing error locations; and
authoring DMB ECG XML (eXtensible Markup Language)-based metadata through the basic ECG metadata, the segment metadata, the package metadata, and the DMB AF metadata,
wherein the generating and editing generates and edits the DMB AF metadata coupled all contents particulars in a single format,
wherein the generation unit is configured to author the DMB ECG XML-based metadata by generating and editing basic ECG metadata, segment metadata, and package metadata.

19. The method of claim 18, wherein the DMB ECG XML-based metadata comprises, as basic parts of the DMB AF metadata, a package table, a user description, a classification scheme table, and a copyright notice table and comprises, as extended parts of the DMB AF metadata, a program information table, a group information table, a program location table, a service information table, a segment information table, and a coupon table.

* * * * *